United States Patent [19]

Warnan et al.

[11] Patent Number: 5,014,953
[45] Date of Patent: May 14, 1991

[54] HINGED-ARM TYPE OF MECHANISM AND SONAR ANTENNA FITTED OUT WITH A MECHANISM SUCH AS THIS

[75] Inventors: Francois Warnan, Rambouillet; Joël Barbot, Wissous, both of France

[73] Assignee: Thomson-CSF, Puteaux, France

[21] Appl. No.: 422,545

[22] Filed: Oct. 17, 1989

[30] Foreign Application Priority Data

Oct. 21, 1988 [FR] France ................ 88 13831

[51] Int. Cl.⁵ ............................... H01Q 1/08
[52] U.S. Cl. ..................... 248/284; 248/653; 343/880
[58] Field of Search ............. 248/284, 281.1, 287, 248/656, 653; 343/880, 881, 878, 871; 74/103

[56] References Cited

U.S. PATENT DOCUMENTS

| | | | |
|---|---|---|---|
| 2,036,097 | 3/1936 | Pieper | 248/284 X |
| 2,882,004 | 4/1959 | Leishman | 248/284 |
| 3,088,727 | 5/1963 | Pelagatti | 74/103 X |
| 3,291,431 | 12/1966 | Daniel, Jr. | 248/284 X |
| 3,566,346 | 2/1971 | Scopatz | 343/881 X |
| 3,886,491 | 5/1975 | Jonkey et al. | |
| 3,995,797 | 12/1976 | Knight | 248/656 X |
| 4,723,128 | 2/1988 | Gasque, Jr. | 343/880 |
| 4,736,641 | 4/1988 | Reid | 248/284 X |

FOREIGN PATENT DOCUMENTS

| | | | |
|---|---|---|---|
| 166440 | 1/1934 | Fed. Rep. of Germany | 248/284 |
| 2249761 | 5/1973 | Fed. Rep. of Germany | |
| 2406274 | 8/1975 | Fed. Rep. of Germany | |
| 706913 | 4/1954 | United Kingdom | 248/284 |
| 2167240 | 5/1986 | United Kingdom | 343/881 |

Primary Examiner—Karen J. Chotkowski
Attorney, Agent, or Firm—Oblon, Spivak, McClelland, Maier & Neustadt

[57] ABSTRACT

Disclosed is a mechanism comprising an arm hinged on a connecting rod to make a choice, on the basis of a translational motion along two opposite directions, between "lowered arm" and "outstretched arm" positions that are substantially orthogonal to each other. In this mechanism, the rod and the arm, when the latter is lowered, form an obtuse angle, and the rotation pins other than the pin common to the rod and to the arm are fixed as regards the pin of the connecting rod, and undergo translational motion as regards that of the arm. The free end of the arm coming to the lowered arm position thus follows a trajectory with downward sliding and passage through a "hard point" which ensures that the arm is efficiently kept in the lowered position.

4 Claims, 2 Drawing Sheets

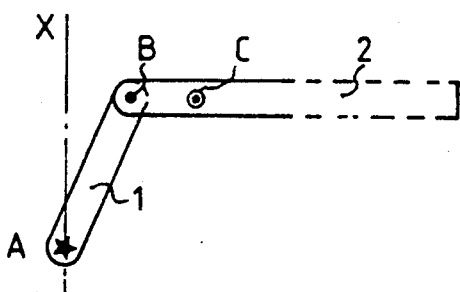
Fig. 1a
PRIOR ART
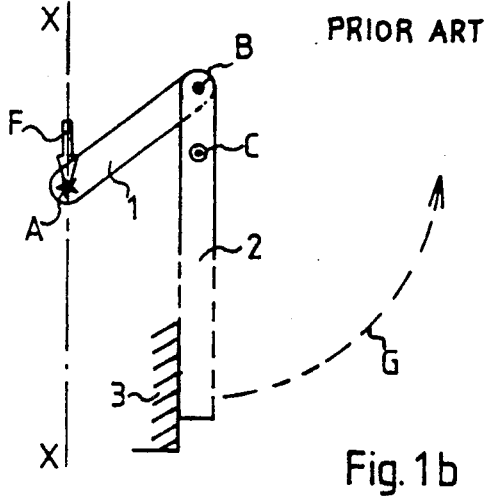
Fig. 1b
PRIOR ART
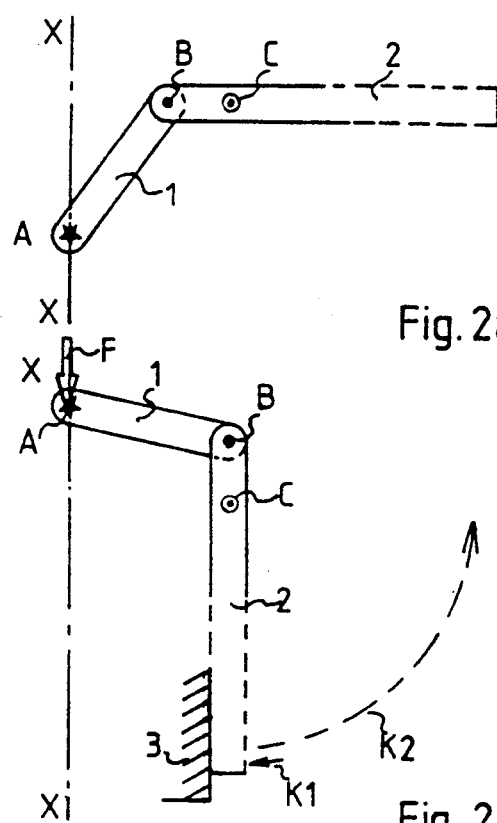
Fig. 2a
Fig. 2b
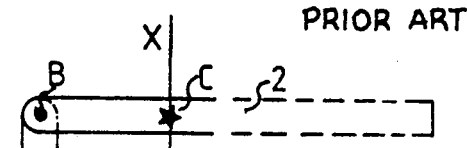
Fig. 3A
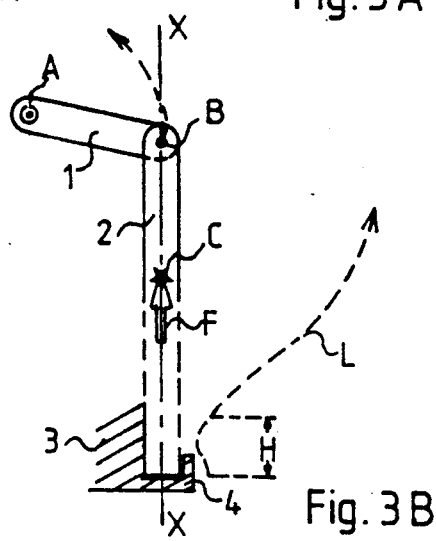
Fig. 3B
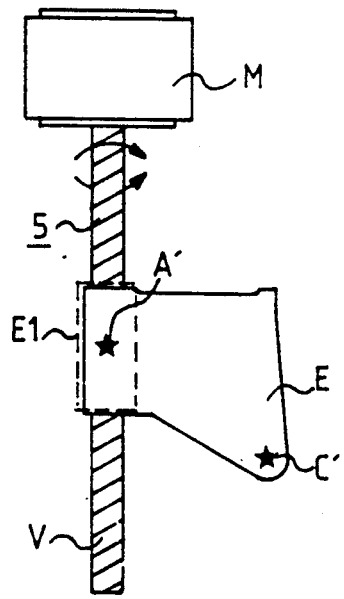
Fig. 4

5,014,953

HINGED-ARM TYPE OF MECHANISM AND SONAR ANTENNA FITTED OUT WITH A MECHANISM SUCH AS THIS

BACKGROUND OF THE INVENTION

1. Field of the Invention

The present invention concerns a mechanism that can be used, in particular, for a sonar antenna, and comprises a support, an arm and a connecting rod, the arm and the connecting rod being movable in parallel planes, a driving device to give a translational motion along two opposite directions so that, by mechanical coupling, the arm is made to go from the "lowered arm" position to the "outstretched arm" position and vice versa, a first, second and third "rotation pin", namely a pin defining an axis of rotation around which one or more parts may rotate, said rotation pins being perpendicular to the parallel planes and acting, respectively, as rotation pins for the first end of the connecting rod, the second end of the connecting rod and the first end of the arm, and for the arm at a point of the arm located at a given distance from its first end.

2. Description of the Prior Art

Such mechanisms are known, and an embodiment of one of these known mechanisms shall be described with the help of FIGS. 1a and 1b. As shall be seen from the description of these figures, the known mechanisms drive a simple pivoting motion of the arm between two extreme positions, namely the "lowered arm" and "outstretched arm" positions, without enabling the arm to be kept, reliably, in the "lowered arm" position. Now it turns out that, in certain applications, for reasons related to the protection of equipment exposed to harsh environmental conditions, it is useful to have a system for properly locking the arm in the lowered position, that is, a locking system capable of withstanding vibrations and even lateral tugging forces.

SUMMARY OF THE INVENTION

An aim of the present invention is to prevent or, at least, to reduce the drawbacks of the known mechanisms.

This is obtained, in particular, by giving the three pins degrees of freedom that are different from those they have in the known mechanisms.

According to the present invention, there is provided a mechanism comprising a support, an arm having a first end and a second end, a connecting rod having a first end and a second end, the arm and the connecting rod being movable in parallel planes, a first, second and third rotation pin, namely a pin defining an axis of rotation around which one or more parts may rotate, said rotation pins being perpendicular to the parallel planes and acting, respectively, as rotation pins for the first end of the connecting rod, for the second end of the connecting rod and the first end of the arm, and for the arm at a point of the arm located at a given distance from its first end, the first pin being fixed with respect to the support, a driving device to give a translational motion along two opposite directions so that, by mechanical coupling, the arm is made to go from a "lowered arm" position to an "outstretched arm" position and vice versa, the translational motion being applied to the third pin perpendicularly to the third pin, and wherein, in the "lowered arm" position, the arm and the connecting rod form an obtuse angle.

BRIEF DESCRIPTION OF THE DRAWINGS

The present invention will be better understood from the following description, and from the figures relating thereto, of which:

FIGS 1a and 1b are two drawings of a mechanism according to the prior art;

FIGS. 2a and 2b are two drawings of a mechanism that is an improvement over the mechanism according to FIGS. 1a and FIG. 1b.

FIGS. 3a and 3b are two drawings of a mechanism according to the invention;

FIG. 4 is a drawing of a driving device that can be used in the mechanism according to the preceding figures;

DETAILED DESCRIPTION OF THE PREFERRED EMBODIMENT

Figure 5A:
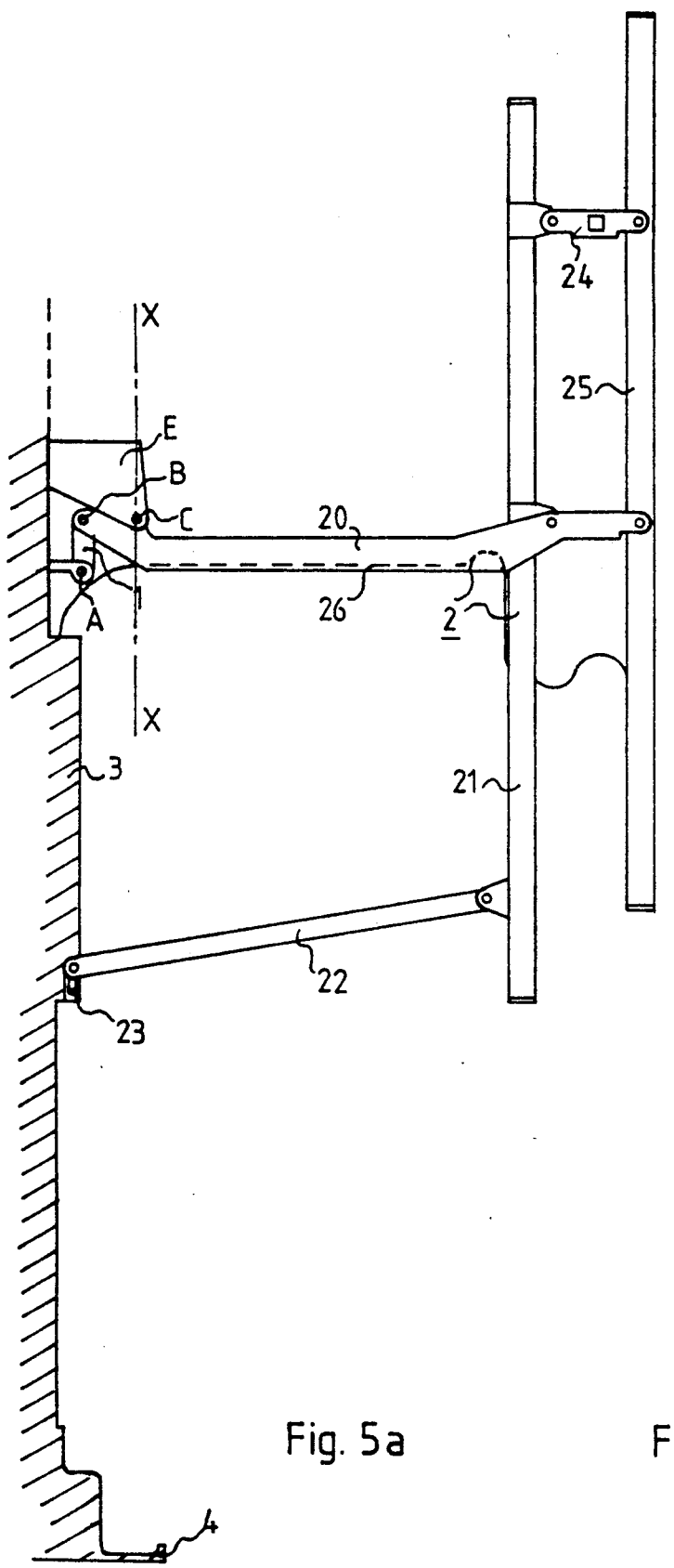
FIGS. 5a and 5b are detailed drawings of a mechanism according to the invention.

FIGS. 1a, 2a, 3a are drawings showing hinged-arm type mechanisms in the "outstretched arm" position, and FIGS. 1b, 2b and 3b are drawings showing the same mechanisms, but in the "lowered arm" position. By convention, in these figures, the fixed rotation pins are represented by an encircled black dot, the pins with only one degree of freedom are represented by a star, and the other pins are represented by a simple black dot. In all these drawings, the straight line in the plane of the drawing, along which the pins having only one degree of freedom move, has been drawn and referenced XX. The direction of the force that determines this shift to change from the "lowered arm" position to the "outstretched arm" position is symbolized by a heavy arrow F which ends at the point with one degree of liberty. It must be further noted that the rotation pins represented in FIGS. 1a to 3b are perpendicular to the plane of the drawing.

FIGS. 1a and 1i b show a mechanism in two extreme positions. This mechanism has a mechanical arm 2, hinged at one of its ends, on one end of a connecting rod 1, by a second rotation pin B. The arm 2 and the connecting rod 2 are movable in planes parallel to the plane of the figure. The first end of the connecting rod 1 can rotate on a first rotation pin A which has one degree of liberty, given that its shifts are restricted to translations along the straight line XX. A driving device, the drawing of which is shown in FIG. 4, determines these shifts. The arm 2 can rotate on a fixed third pin C which is in the vicinity of the first end of the arm 2 hinged on the connecting rod 1, but is slightly further away than the second pin B from this first end.

FIG. 1b shows the mechanism in the "lowered arm" position, that is, the arm 2 is parallel to XX. In the example described, this corresponds to the arm in a vertical position with the second pin B at the top of the arm. In this position the arm leans, by its free end, against a wall of the support 3 which constitutes the fixed part of the mechanism. This is a part with respect to which the straight line XX and the third pin C are fixed. It must be noted that the connecting rod and the arm then form an acute angle of about 45 degrees, and that the plane of the wall on which the arm 2 leans is parallel to the plane of the line XX in which the first pin A moves. By a downward translation of the pin A, the arm 2 pivots on its fixed pin C and comes to the "outstretched arm" position in describing an arc of a circle of about 90 degrees, as symbolized by the arrow G.

The FIG. 1a shows the arm and the connecting rod in the "outstretched arm" position, i.e. with the arm perpendicular to the pin XX.

FIGS. 2a and 2b show how the mechanism according to the FIGS. 1a and 1b can be improved by modifying just the angle formed by the connecting rod and the arm in the "lowered arm" position. As FIG. 2b shows, the mechanism differs from that of FIGS. 1a and 1b only in that the connecting rod and the arm form no longer an acute angle but an obtuse angle when the arm is down. This angle, which is slightly greater than 90 degrees, means that, when the connecting rod is shifted downwardly with respect to the pin XX, under the effect of the force F, the arm rotates on the fixed third pin C, firstly with its free end which is thrust towards the support 3 until the instant when the connecting rod passes through the horizontal. Then the arm rises to reach the "outstretched arm" position shown in FIG. 2a. Arrows K1 and K2, in FIG. 2b, symbolize this motion with two successive directions. It has to be noted that, in the "lowered arm" position, the free second end of the arm 2 leans on the support 3, so much so that when it is pushed, as indicated by the arrow K1, towards the support 3, it leans only more strongly on the support 3 while the arm 2 gets slightly folded. Thus, in the reverse direction, when the arm 2 is brought from the "outstretched arm" position to the "lowered arm" position, slightly before getting fixed in position, it passes through a "hard point", namely through a transitional position where the pressure that it exerts on the support 3 reaches a maximum value. This "hard point" and the "flying buttress" position taken up by the connecting rod 1 with respect to the arm 2, when the latter is down, ensures that the arm 2 is more reliably kept in the lowered position than with the device according to FIGS. 1a and 1b.

FIGS. 3a and 3b show a mechanism with a connecting rod 1 and an arm 2 having a first end hinged on a second end of the connecting rod 1, which is similar to the one shown in FIGS. 2a and 2b in the obtuse angle formed by the connecting rod 1 and the arm 2 in the "lowered arm" position, but which differs from it notably in the role played by the respective first and third rotation pins A and C, with the first pin A becoming fixed and the third pin C becoming the pin subjected to the translational motion along XX. To lift the arm 2, the translational motion identified by the arrow F in FIG. 3b, tends to pull the free second end of the arm 2 along a path symbolized by the arrowed curve L of FIG. 3b. So long as the connecting rod 1 is near the perpendicular to XX, and had there been no wall of the support 3 of the mechanism to prevent it from happening, the free second end of the arm 2 would describe, along a height H, an upward trajectory which, initially, would move it slightly away from the straight line XX, on the side of the half-plane which is limited to this straight line and contains the fixed first pin A which, in a second stage, after the passage of the connecting rod 1 to a horizontal position, would bring it back towards the straight line XX. Owing to the presence of the wall of the support 3, on which the arm 2 leans in the lowered position, the second end of the arm 2 can only slide vertically upwards, along the height H, passing through a "hard point" at the moment when the connecting rod 1 is horizontal. During this translational motion of its free second end, the arm 2 gets slightly folded. Then, with the connecting rod 1 continuing to rotate, the free second end of the connecting rod 1 effectively describes the rest of the trajectory L and ends in the "lowered arm" outstretched arm position shown in FIG. 3a. Thus, the mechanism according to FIGS. 3a and 3b has the same advantages as the one according to FIGS. 2a and 2b: a "hard point" just before the arm is totally down and the "flying buttress" position of the connecting rod with respect to the arm when the latter is down. The mechanism according to FIGS. 3a and 3b has an additional advantage, as can be seen in FIG. 3b. In effect, the vertical translational motion done, along the height H, by the free second end of the arm 2, enables this end to be made to go behind a protection shoulder 4, which is fixedly joined to the support 3 and it is thus possible to ensure that, with a reinforced safety system, the arm 2 is kept in the lowered position.

FIG. 4 shows an embodiment of the driving device, providing for the translational motion along XX, referred to in the descriptions of the preceding FIGS. The device 5 has a motor M, the shaft V of which is formed by a worm screw that rotates in a nut sliding in a rail (not shown), parallel to the shaft of the motor. This nut is coupled to one of the mechanisms according to the preceding FIGS. by the rotation pin, with one degree of freedom, of this mechanism. In the case of the mechanisms according to the FIGS. 1a-1b and 2a-2b, the coupling is done with the first pin A closest to the shaft V of the motor. A part E1, drawn with dashes in FIG. 4 and having a coupling point A' with the first pin A, acts as a bolt. In the case of the mechanism according to the FIGS. 3a-3b, to prevent the driving device from going beyond the support, the nut is formed by a part E', which has a coupling point C' with the third pin C of the arm 2 of FIGS. 3a-3b. This coupling point C' is offset with respect to the shaft V of the motor M so that the motor M can be placed entirely on the left-hand side of the axis XX of FIGS. 3a-3b, i.e. well within the support 3, partially shown in FIG. 3b.

Figure 5B:
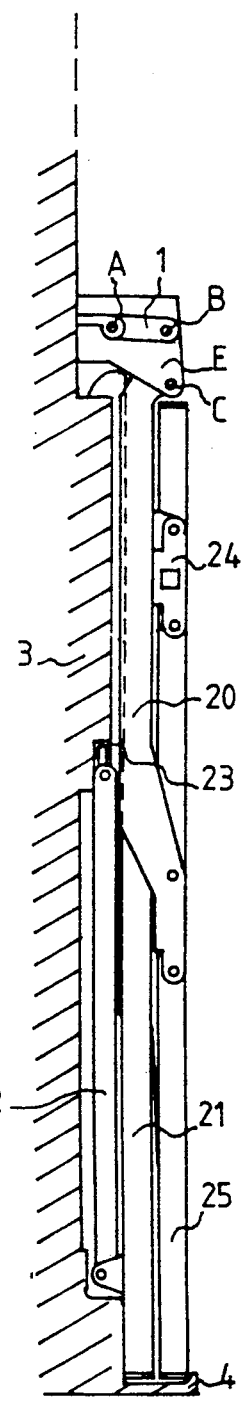

FIGS. 5a-5b are detailed drawings of an embodiment of a mechanism of the type shown in the FIGS. 3a, 3b applied to a sonar antenna. The mechanism is shown with the arm 2 in the outstretched position in FIG. 5a and in the lowered position in FIG. 5b. In these FIGS., the wall of the support 3 has been shown in its entire part neighboring the hinged arm and, particularly, at the position of the protection shoulder 4 and the fixing point A' of the first pin A referred to in the description of FIGS. 3a, 3b and 4. These FIGS. show all the parts already described in the FIGS. 3a and 3b, and their roles remain identical. However, in this case, the arm 2 is not formed by a single bar. In effect, it is formed by a carrier bar 20, hinged towards its first end on the second and third pins B and C and forming, towards its second end, one of the small sides of a deformable parallelogram, the two large sides of which are formed by crossmembers 21, 25, within which hydrophones are placed. The other small side of the parallelogram is formed by a link-rod 24. In order to keep the position of the crossmembers constant, irrespectively of the position of the carrier bar 20 with respect to the support 3, an ancillary bar 22 is hinged at one of its ends on a fourth pin perpendicular to the plane of the drawing and is imprisoned in a slot 23 parallel to xx and made in the support 3. At the other of its ends, the ancillary bar 22 is hinged on the cross-member 21. The slot 23 is designed to enable the vertical translational motion undergone by the arm when it is lowered, as described with reference to FIGS. 3a and 3b. It has to be noted that, in the "lowered arm" position, it is the lower end of the cross-members 21, 25 that is behind the shoulder 4.

FIG. 5a also shows an electrical cable 26 that connects the hydrophones of the cross-members 21, 25 to the electronic circuits contained in the support 3, said support being, in the example described, the body of a sonar antenna around which twelve mechanisms, identical to the mechanism according to FIGS. 5a and 5b, are evenly distributed.

The present invention is not restricted to the examples described, but also concerns any device comprising a rod and a hinged arm as in FIGS. 3a, 3b, even if the support 3 has no shoulder 4, or even if the arm 2 has a hook which, in FIG. 3b, would be placed on the left-hand side and be pointed downwards and would get engaged in a cavity pieced in the wall of the support 3 and be protected, at its lower side, by a shoulder forming no protuberance on the wall of the support.

Similarly, the arm 2 may have only one bar as in FIGS. 3a and 3b, the hydrophones being then housed in this bar. Or else the arm, instead of having two cross-members as in FIGS. 5a and 5b, may have only one cross-member, for example the cross-member 21 of FIGS. 5a, 5b or else it may have more than two cross-members, provided that these cross-members together form deformable parallelograms.

What is claimed is:

1. A mechanism comprising:
   a support,
   an arm having a first end and a second end,
   a connecting rod having a first end and a second end, the arm and connecting rod being movable in parallel planes,
   a first rotation pin defining an axis of rotation perpendicular to the parallel planes at the first end of the connecting rod, wherein the first pin is fixed with respect to the support,
   a second rotation pin defining an axis of rotation perpendicular to the parallel planes at the second end of the connecting rod and the first end of the arm,
   a third rotation pin defining an axis of rotation perpendicular to the parallel planes at a position of the arm located at a given distance from the first end thereof, and
   a driving device for providing a translational displacement of the third pin along two opposite directions so that the arm is moved between a lowered arm position and an outstretched arm position during the translational displacement of the third pin, the translational motion being applied to the third pin perpendicularly to the axis of rotation of the third pin,
   wherein, in the lowered arm position, the arm and the connecting rod form an obtuse angle, and
   wherein the second end of the arm exerts a force against the support at a position adjacent to the lowered arm position.

2. A mechanism according to claim 1, comprising a shoulder that is fixedly joined to the support and is arranged so as to prevent the arm from moving perpendicularly to the two opposite directions when the arm is in the position.

3. A mechanism according to claim 1, comprising a slot pierced in the support and parallel to the two opposite directions, and a fourth rotation pin that forms an axis of rotation that is perpendicular to the parallel planes and is imprisoned in the slot, wherein the arm comprises a carrier bar having a first end that forms the first end of the arm, and a second end, a holding cross-member and an ancillary bar having a first end and a second end, the ancillary bar being movable at a first end thereof on the fourth rotation pin, and wherein the holding cross-member is hinged on the second ends of the carrier bar and of the ancillary bar.

4. A mechanism according to claim 3, wherein the arm has n (n being a whole number at least equal to 1) cross-members hinged on the carrier bar and coupled mechanically to the holding bar to form deformable parallelograms.

* * * * *